United States Patent
Mayhew

(10) Patent No.: US 8,364,436 B2
(45) Date of Patent: Jan. 29, 2013

(54) SYSTEMS AND METHODS FOR MEASURING VEHICLE SPEED

(75) Inventor: William R. Mayhew, Ann Arbor, MI (US)

(73) Assignee: GM Global Technology Operations LLC

( * ) Notice: Subject to any disclaimer, the term of this patent is extended or adjusted under 35 U.S.C. 154(b) by 409 days.

(21) Appl. No.: 12/603,032

(22) Filed: Oct. 21, 2009

(65) Prior Publication Data

US 2011/0088468 A1 Apr. 21, 2011

(51) Int. Cl.
*G01P 3/00* (2006.01)
(52) U.S. Cl. .......................... 702/145; 702/79
(58) Field of Classification Search .............. 702/79, 702/145; 701/1; 340/441; 324/160; 180/170; 73/54.31, 54.33
See application file for complete search history.

(56) References Cited

U.S. PATENT DOCUMENTS

| | | | | |
|---|---|---|---|---|
| 5,913,911 A | * | 6/1999 | Beck et al. | 701/1 |
| 5,977,765 A | * | 11/1999 | Gibson et al. | 324/165 |
| 6,754,151 B2 | * | 6/2004 | Watt | 369/47.36 |
| 6,999,886 B2 | * | 2/2006 | Hilliard | 702/82 |
| 2004/0114469 A1 | * | 6/2004 | Duffner et al. | 368/113 |
| 2007/0047458 A1 | * | 3/2007 | Adkisson | 370/252 |

FOREIGN PATENT DOCUMENTS

| | | |
|---|---|---|
| DE | 4133679 A1 | 4/1993 |
| DE | 60318767 T2 | 7/2008 |
| DE | 102008013288 A1 | 9/2009 |

OTHER PUBLICATIONS

Office Action dated Mar. 3, 2012 from the German Patent Office for German Patent Application No. 10 2010 048 787.2; 5 pages.

* cited by examiner

*Primary Examiner* — Michael Nghiem
*Assistant Examiner* — Elias Desta

(57) ABSTRACT

A system includes a processing module, a sampling module, a period determination module, and a speed determination module. The processing module generates time stamps when pulses are received from a sensor that senses a rotation of a device. The sampling module samples the time stamps during N predetermined intervals and stores N of the time stamps that correspond to the N predetermined intervals, where N is an integer that is greater than 2. The period determination module determines a plurality of periods, wherein each one of the plurality of periods is based on a difference between two of the N time stamps. The speed determination module determines a rotational speed of the device based on a difference between two of the plurality of periods.

20 Claims, 9 Drawing Sheets

SYSTEMS AND METHODS FOR MEASURING VEHICLE SPEED

FIELD

The present invention relates to determining a speed of rotating devices, and particularly to systems and methods for determining vehicle speed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include a speed sensor to monitor vehicle speed. The speed sensor may include a wheel speed sensor. The wheel speed sensor generates a wheel speed signal that indicates rotation of a wheel. An engine control module may determine the vehicle speed based on the wheel speed signal.

For example, the wheel speed sensor may include a Hall-effect sensor that detects passing of teeth on a gear connected to the wheel. The Hall-effect sensor may generate pulses that correspond to the passing of the teeth. Accordingly, the wheel speed signal may include pulses.

The engine control module may determine the vehicle speed based on a number of pulses included in the wheel speed signal during a period of time. The number of pulses included in the wheel speed signal during the period of time may be related to the vehicle speed. For example, a larger number of pulses during the period of time may correspond to a higher vehicle speed, while a smaller number of pulses during the period of time may correspond to a lower vehicle speed.

SUMMARY

A system comprises a processing module, a sampling module, a period determination module, and a speed determination module. The processing module generates time stamps when pulses are received from a sensor that senses a rotation of a device. The sampling module samples the time stamps during N predetermined intervals and stores N of the time stamps that correspond to the N predetermined intervals, where N is an integer that is greater than 2. The period determination module determines a plurality of periods, wherein each one of the plurality of periods is based on a difference between two of the N time stamps. The speed determination module determines a rotational speed of the device based on a difference between two of the plurality of periods.

A method comprises generating time stamps when pulses are received from a sensor that senses a rotation of a device and sampling the time stamps during N predetermined intervals. The method further comprises storing N of the time stamps that correspond to the N predetermined intervals, where N is an integer that is greater than 2. The method further comprises determining a plurality of periods, wherein each one of the plurality of periods is based on a difference between two of the N time stamps. Additionally, the method comprises determining a rotational speed of the device based on a difference between two of the plurality of periods.

BRIEF DESCRIPTION OF THE DRAWINGS

The drawings described herein are for illustration purposes only and are not intended to limit the scope of the present disclosure in any way.

DETAILED DESCRIPTION

Figure 1:
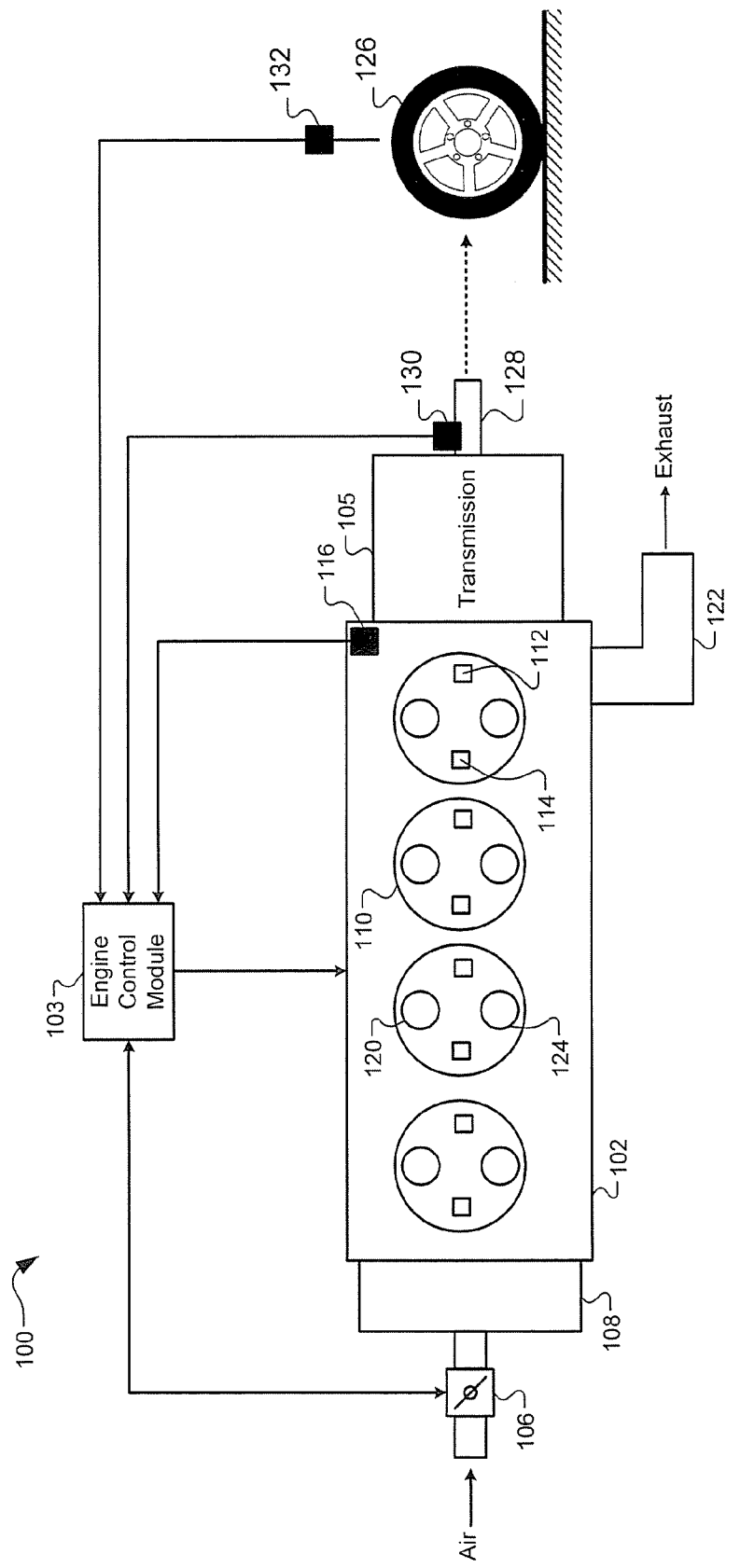
FIG. 1 is a functional block diagram of a vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A speed sensor may detect the passing of teeth on a gear connected to a component of a vehicle. The speed sensor may generate a vehicle speed signal that includes pulses that correspond to the passing of the teeth. Typically, an engine control module determines a vehicle speed based on a number of pulses received from the speed sensor during a period of time. The engine control module may determine the vehicle speed incorrectly when pulses arise due to noise. For example, the engine control module may determine that the vehicle speed is higher than an actual vehicle speed when the vehicle speed signal includes additional pulses due to noise.

A speed determination system of the present disclosure may determine the vehicle speed without counting the number of pulses that are received during the period of time. The speed determination system may therefore determine vehicle speeds correctly when noise is present. The speed determination system determines the vehicle speed based on times when the pulses are received from the speed sensor. The speed determination system may generate time stamps for received pulses, sample the time stamps at predetermined intervals, and generate periods based on differences in time stamps at the predetermined intervals. The speed determination system may determine the vehicle speed based on a difference between two of the periods.

Referring now to FIG. 1, an exemplary vehicle system 100 includes a combustion engine 102 that drives a transmission 105 via a crankshaft (not shown). While a spark ignition engine is illustrated, other engines are contemplated. For example only, compression ignition engines and homogenous charge compression ignition (HCCI) engines are also contemplated. An engine control module (ECM) 103 communicates with components of the vehicle system 100. The components may include the engine 102, sensors, and actuators.

The ECM 103 may actuate a throttle 106 to regulate airflow into an intake manifold 108. Air within the intake manifold 108 is distributed into cylinders 110. The ECM 103 actuates fuel injectors 112 to inject fuel into the cylinders 110. The ECM 103 may actuate spark plugs 114 to ignite an air/fuel mixture in the cylinders 110. Alternatively, the air/fuel mixture may be ignited by compression in a compression ignition engine. While four cylinders 110 of the engine 102 are shown, the engine 102 may include more or less than four cylinders 110.

The crankshaft rotates at engine speed or a rate that is proportional to the engine speed. A crankshaft sensor 116 generates a crankshaft signal that indicates rotation of the crankshaft. For example, the crankshaft signal may indicate a passing of teeth on a gear connected to the crankshaft. For example only, the crankshaft sensor 116 may include at least one of an optical sensor and a Hall-effect sensor. Rotation of the crankshaft may be sensed using other suitable methods.

An intake camshaft (not shown) regulates a position of an intake valve 120 to enable air to enter the cylinder 110. Combustion exhaust within the cylinder 110 is forced out through an exhaust manifold 122 when an exhaust valve 124 is in an open position. An exhaust camshaft (not shown) regulates a position of the exhaust valve 124. Although single intake and exhaust valves 120, 124 are illustrated, the engine 102 may include multiple intake and exhaust valves 120, 124 per cylinder 110.

Drive torque produced by the engine 102 may drive wheels 126 via an output shaft 128. The vehicle system 100 may include a vehicle speed sensor 130 that generates a vehicle speed signal. The vehicle speed signal may indicate a passing of teeth on a gear connected to the output shaft 128. Accordingly, the vehicle speed signal may indicate a speed of rotation of the output shaft 128. For example only, the vehicle speed sensor 130 may include at least one of an optical sensor and a Hall-effect sensor. The ECM 103 may determine a speed of the vehicle based on the vehicle speed signal.

The vehicle system 100 may include one or more wheel speed sensors 132 that generate wheel speed signals. The wheel speed signals may indicate a passing of teeth on a gear connected to the wheels 126. Accordingly, the wheel speed signals may indicate rotational speed of the wheels 126. The ECM 103 may determine the speed of the vehicle based on the wheel speed signals.

The vehicle speed signal may include pulses. The ECM 103 may determine the vehicle speed based on the pulses in the vehicle speed signal. The ECM 103 may receive pulses from the vehicle speed sensor 130 that indicate rotation of the output shaft 128 (hereinafter "signal pulses"). The ECM 103 may receive pulses from the vehicle speed sensor 130 due to noise (hereinafter "error pulses"). The ECM 103 may determine the vehicle speed incorrectly when the ECM 103 receives error pulses. For example, the ECM 103 may determine that the vehicle speed is higher than an actual vehicle speed when the ECM 103 determines the vehicle speed based on the error pulses. The error pulses may arise due to mechanical tolerances of the vehicle system 100. For example, variation in tooth to tooth spacing on the gear connected to the output shaft 128 may give rise to the error pulses.

The speed determination system of the present disclosure may determine the vehicle speed based on the vehicle speed signal. Additionally, the speed determination system may determine the vehicle speed based on components of the vehicle system 100 other than the output shaft 128. For example, the speed determination system may determine the vehicle speed based on wheel speed signals, the crankshaft signal, and a signal from a camshaft sensor (not shown) that indicates rotation of the intake/exhaust camshaft. Generally, the speed determination system may be applicable to digital sensor systems that measure rotational speed of rotating devices.

Figure 2:
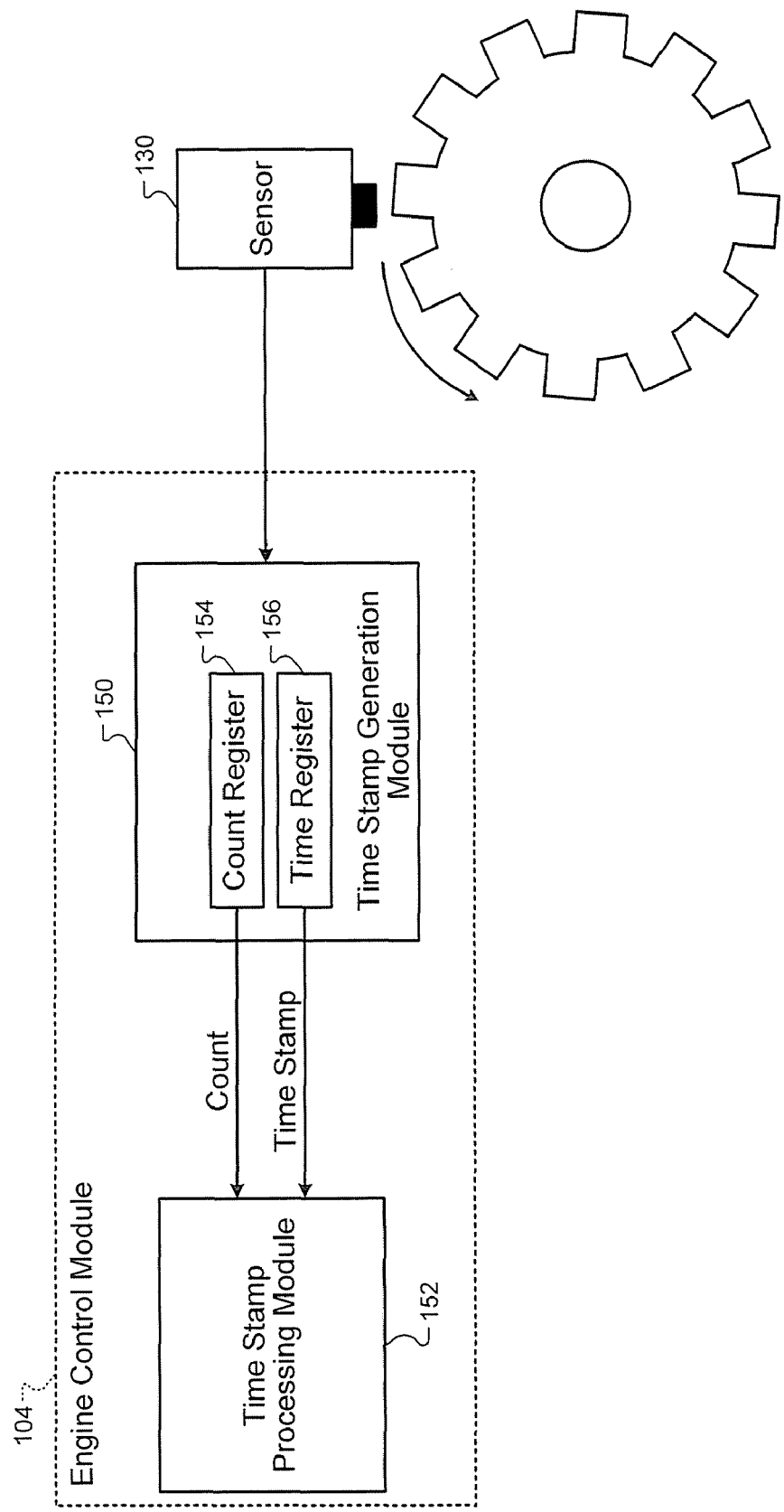
FIG. 2 is a functional block diagram of an engine control module that interfaces with a sensor that indicates vehicle speed according to the present disclosure.

Referring now to FIG. 2, an ECM 104 according to the present disclosure may implement the speed determination system. The ECM 104 includes a time stamp generation module (TSM) 150 and a time stamp processing module 152. The TSM 150 receives pulses from the vehicle speed sensor 130. The TSM 150 may increment a counter when the TSM 150 receives a pulse. The TSM 150 may store a total number of pulses it receives. The total number of pulses received by the TSM 150 may be called a "count."

Additionally, the TSM 150 may store a time when each pulse is received. The time when a most recent pulse is received may be called a "time stamp." The TSM 150 may include a count register 154 and a time register 156 that store the count and the time stamp, respectively. For example, the count register 154 may store a count of 7, and the time register 156 may store a time stamp of 20 milliseconds (ms) when the TSM 150 has received 7 pulses, the last of which was received at a time of 20 ms.

Figure 3:
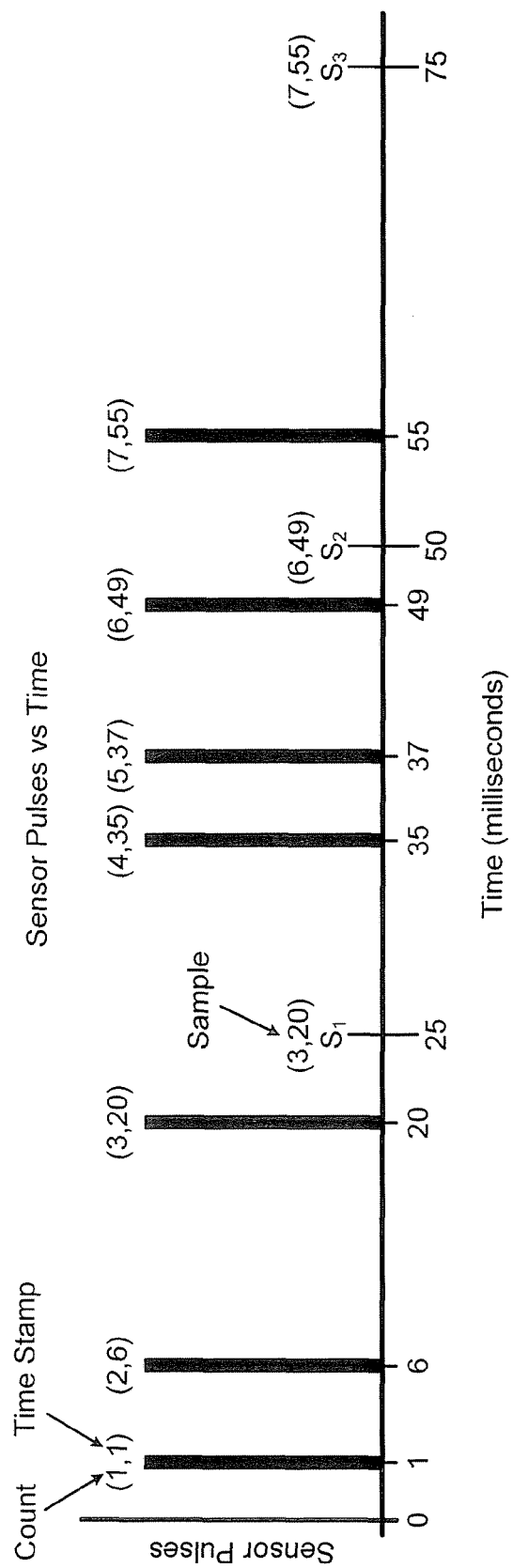
FIG. 3 illustrates sensor pulses received from the sensor that indicates vehicle speed.

Referring now to FIG. 3, exemplary pulses received by the TSM 150 are shown. Each pulse is labeled as (count, time stamp). The TSM 150 receives a first pulse at 1 ms. Accordingly, the count register 154 and the time register 156 store the count as 1 and the time stamp as 1 ms, respectively. The TSM 150 receives a third pulse at 20 ms. Accordingly, the count register 154 and the time register 156 store the count as 3 and the time stamp as 20 ms, respectively.

Figure 4:
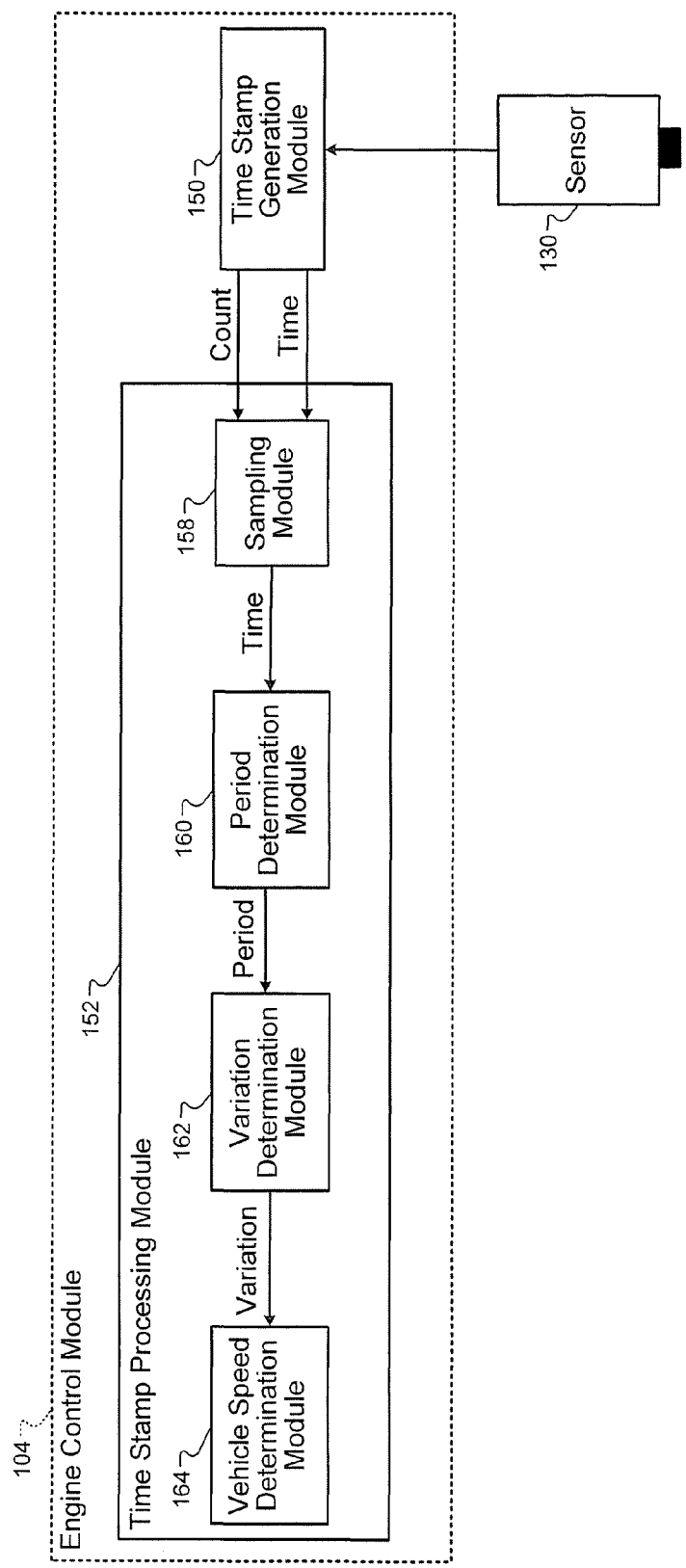
FIG. 4 is a functional block diagram of the engine control module according to the present disclosure.

Referring now to FIG. 4, the time stamp processing module 152 includes a sampling module 158, a period determination module 160, a variation determination module 162, and a vehicle speed determination module 164. The sampling module 158 may sample the count and the time stamp from the count register 154 and the time register 156, respectively. The sampling module 158 may sample the count and the time stamp at predetermined sample intervals. For example, the sampling module 158 may sample the count and the time stamp at 25 ms intervals. The sampling module 158 may store the count and the time stamp sampled at each predetermined sample interval.

Referring back to FIG. 3, for example, the sampling module 158 samples the count and the time stamp at predetermined sample intervals of 25 ms. The samples are shown as $S_1$, $S_2$, and $S_3$. Each sample of the count and the time stamp is labeled as (count, time stamp). For example, at 25 ms, the sampling module 158 samples a count of 3 and a time stamp of 20 ms. Thus, the sample $S_1$ is $S_1(3, 20)$. At 75 ms, the sampling module 158 samples a count of 7 and a time stamp of 55 ms. Thus, the sample $S_3$ is $S_3(7, 55)$. The sampling module 158 outputs the sampled time stamps to the period determination module 160.

Typically, the vehicle speed is determined based on a total number of counts during a period. For example, the vehicle speed may be proportional to a ratio of the number of counts to the length of the period. A system that determines the vehicle speed based on the total number of counts during the period may be called a "counting system." In FIG. 3, a counting system may determine that there were 3 pulses during the 25 ms period from $S_1$ to $S_2$. Accordingly, the counting system may determine that the vehicle speed is proportional to 3 counts during 25 ms. As a further example, the counting system may determine the vehicle speed based on the difference between the count and time stamp values sampled at $S_1$ and $S_2$. Accordingly, the counting system may determine that the vehicle speed is proportional to 3 counts in 29 ms (i.e., $S_2$-$S_1$).

Figure 5A:
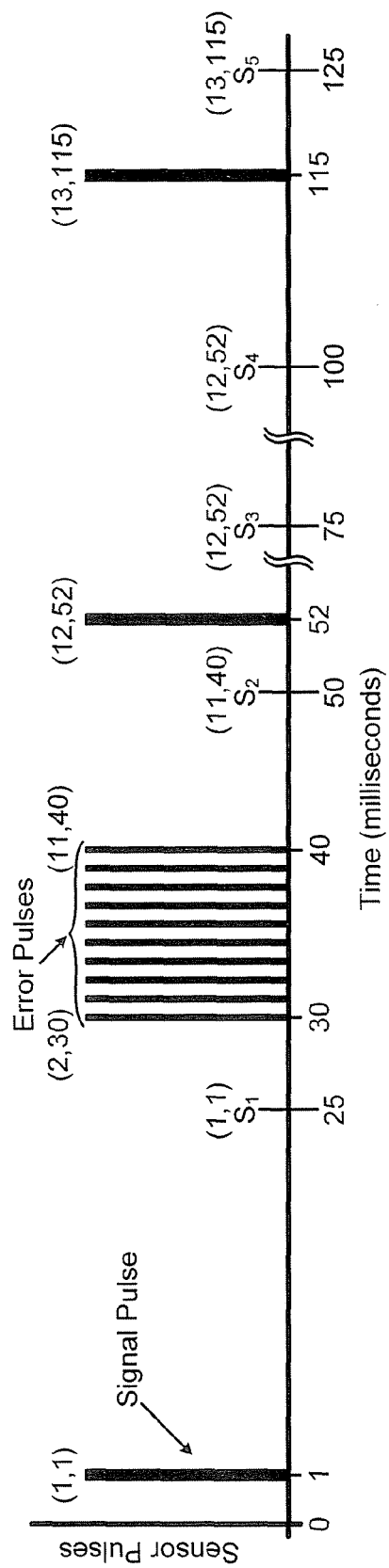
FIG. 5A illustrates sensor pulses and high frequency noise received from the sensor that indicates vehicle speed according to the present disclosure.

Referring now to FIG. 5A, the vehicle speed sensor 130 may generate signal pulses and error pulses. For example, the pulses shown at (1, 1), (12, 52), and (13, 115) represent signal pulses, and the 10 pulses shown from (2, 30) until (11, 40) represent error pulses. The counting system may determine the vehicle speed incorrectly when the vehicle speed sensor 130 generates the error pulses. For example, if the error pulses shown in FIG. 5A were not present, the counting system may determine that the vehicle speed is proportional to 1 pulse in every other 25 ms interval. When the error pulses are present, however, the counting system would determine that the vehicle speed is proportional to 10 pulses in the 25 ms interval from $S_1$ to $S_2$, which may yield a vehicle speed that is incorrect by a factor of greater than 10.

The error pulses shown in FIG. 5A may be called high frequency noise since the error pulses are generated at a rate greater than the signal pulses when the vehicle speed is low (e.g., 1 pulse in every other 25 ms interval). If the ECM 104 implemented the counting system, the ECM 104 would determine the vehicle speed incorrectly when high frequency noise is present at low vehicle speed. The speed determination system eliminates errors in vehicle speed measurement that arise due to high frequency noise. The speed determination system eliminates errors by determining the vehicle speed without using the count as follows.

The period determination module 160 receives the time stamps from the sampling module 158. The period determination module 160 determines a difference between successive time stamps when the received time stamps are not equal. The difference between successive time stamps may be called a "period." The period determination module 160 stores the periods.

For example, in FIG. 5A, the period determination module 160 would receive a time stamp of 1 ms at $S_1$, a time stamp of 40 ms at $S_2$, a time stamp of 52 ms at $S_3$ and $S_4$, and a time stamp of 115 ms at $S_5$. Accordingly, the period determination module 160 determines periods of 39 ms, 12 ms, and 63 ms corresponding to the differences in time stamps between $S_2$-$S_1$, $S_3$-$S_2$, and $S_5$-$S_4$, respectively. The period determination module 160 does not determine a period for the difference $S_4$-$S_3$ because the received time stamps corresponding to $S_3$ and $S_4$ are equal. In other words, the period determination module 160 determines a period at the end of a predetermined sample interval that includes at least one pulse.

Alternatively, when the error pulses are not present, the period determination module 160 receives a time stamp of 1 ms at $S_1$ and at $S_2$, a time stamp of 52 ms at $S_3$ and $S_4$, and a time stamp of 115 ms at $S_5$. Accordingly, the period determination module 160 determines periods of 51 ms and 63 ms corresponding to differences in time stamps between $S_3$-$S_1$ and $S_5$-$S_3$. The period determination module 160 does not determine periods corresponding to the differences in time stamps $S_2$-$S_1$ and $S_4$-$S_3$ because the received time stamps are equal from $S_1$ to $S_2$ and from $S_3$ to $S_4$. The period determination module 160 outputs each period to the variation determination module 162.

The variation determination module 162 determines a variation value based on a plurality of the periods. The variation determination module 162 may determine the variation value based on the difference between a longest period and a shortest period of a plurality of periods received from the period determination module 160. For example, in FIG. 5A, the variation determination module 162 would determine a variation value of 51 ms based on the difference between the 63 ms period (i.e., the longest period) and the 12 ms period (i.e., the shortest period). Alternatively, if the error pulses were not present, the variation determination module 162 would determine a variation of 12 ms based on the periods of 51 ms and 63 ms.

The variation determination module 162 may determine the variation value based on a predetermined number of the periods. For example, in FIG. 5A, the variation determination module 162 may determine the variation value based on three periods when the high frequency noise is present. Generally, the speed determination system may determine the variation value based on a predetermined number of periods other than three.

Figure 5B:
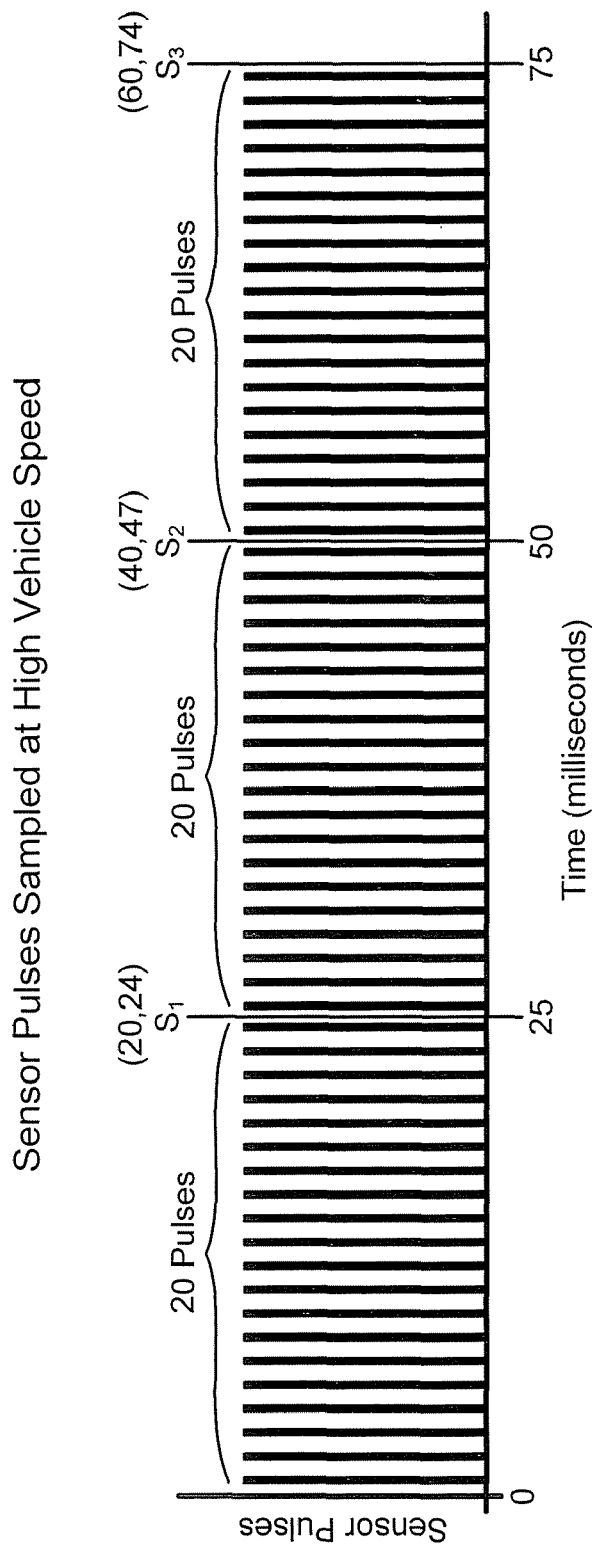
FIG. 5B illustrates sensor pulses received from the sensor at high vehicle speed according to the present disclosure.

Referring now to FIG. 5B, exemplary signal pulses at high vehicle speed (e.g. output shaft speed is greater than 1500 RPM) are shown. The period determination module 160 would determine periods equal to 23 ms (time stamps $S_2$-$S_1$) and 27 ms (time stamps $S_3$-$S_2$). The variation determination module 162 would determine a variation value of 4 ms. When high frequency noise is present at high vehicle speed, the sensor pulses may occur closer in time to the samples $S_1$, $S_2$, and $S_3$. High frequency noise may therefore result in periods that are closer to the predetermined sample interval (i.e., 25 ms), and a variation value that is closer to 0 ms.

In general, sensor pulses sampled at high vehicle speed yield small variation values as shown in FIG. 5B. The small variation values may result since pulses are likely to occur near the sampling points $S_1$, $S_2$, and $S_3$. In other words, pulses that occur near sampling points may yield periods that are close in duration and therefore yield small variation values.

Pulses at low vehicle speed that include high frequency noise will likely result in larger variation values because the high frequency noise will result in some sample periods having a short duration. For example, in FIG. 5A, the period from $S_2$ to $S_3$ is 12 ms when the error pulses are present. The 12 ms period (i.e., $S_3$-$S_2$) due to the error pulses results in a 51 ms variation value (i.e., $(S_5$-$S_3)$-$(S_3$-$S_2))$. The variation value would be 12 ms when the error pulses are not present (i.e., $(S_5$-$S_3)$-$(S_3$-$S_1))$. Accordingly, the error pulses may result in larger variation values when high frequency noise is present at low vehicle speeds.

The vehicle speed determination module 164 may determine the vehicle speed based on the variation value. The vehicle speed determination module 164 may determine the vehicle speed based on a vehicle speed model that relates the vehicle speed to the variation value. The vehicle speed model may include experimentally acquired data that relates the vehicle speed to the variation value. For example, the vehicle speed model may include data that relates the speed of the output shaft 128 to the variation value.

Figure 6:
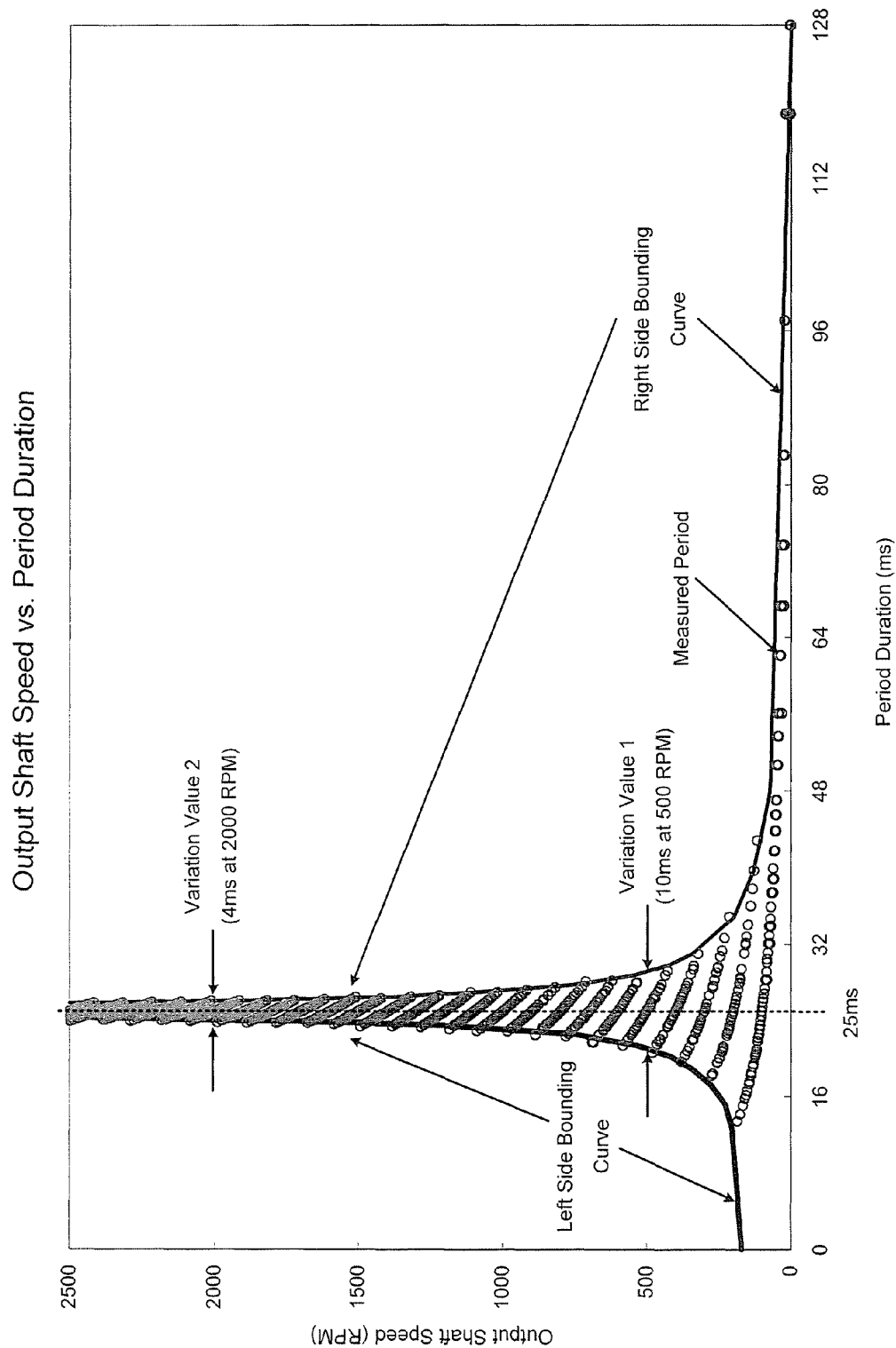
FIG. 6 illustrates output shaft speed versus period duration for an exemplary vehicle system according to the present disclosure.

Referring now to FIG. 6, an exemplary vehicle speed model relates the speed of the output shaft 128 to the variation value. The vehicle speed model may be based on measured periods at various output shaft speeds. Each point shown represents a period measurement by the period determination module 160. For example, the measured periods shown were determined using 25 ms predetermined sample intervals. Accordingly, the measured periods are close to 25 ms at increasing vehicle speed. At lower vehicle speed, however, the measured periods range from 128 ms to less than 16 ms.

The measured periods near 25 ms (e.g., 16 ms) at lower output shaft speed may result due to high frequency noise.

The vehicle speed determination module 164 may determine bounding curves based on the measured periods. The vehicle speed determination module 164 may determine a left side bounding curve that is fit to the shortest periods at each output shaft speed as shown. The vehicle speed determination module 164 may determine a right side bounding curve that is fit to the longest periods at each output shaft speed as shown. The vehicle speed determination module 164 may determine the variation values based on the left side bounding curve and the right side bounding curve. The variation value corresponding to a particular output shaft speed may be determined by subtracting the left side bounding curve from the right side bounding curve at the particular output shaft speed. Variation values at lower output shaft speed may be larger than variation values at higher output shaft speed. For example, a variation value 1 shown is approximately 10 ms at 500 RPM while a variation value 2 shown is approximately 4 ms at 2000 RPM.

Figure 7:
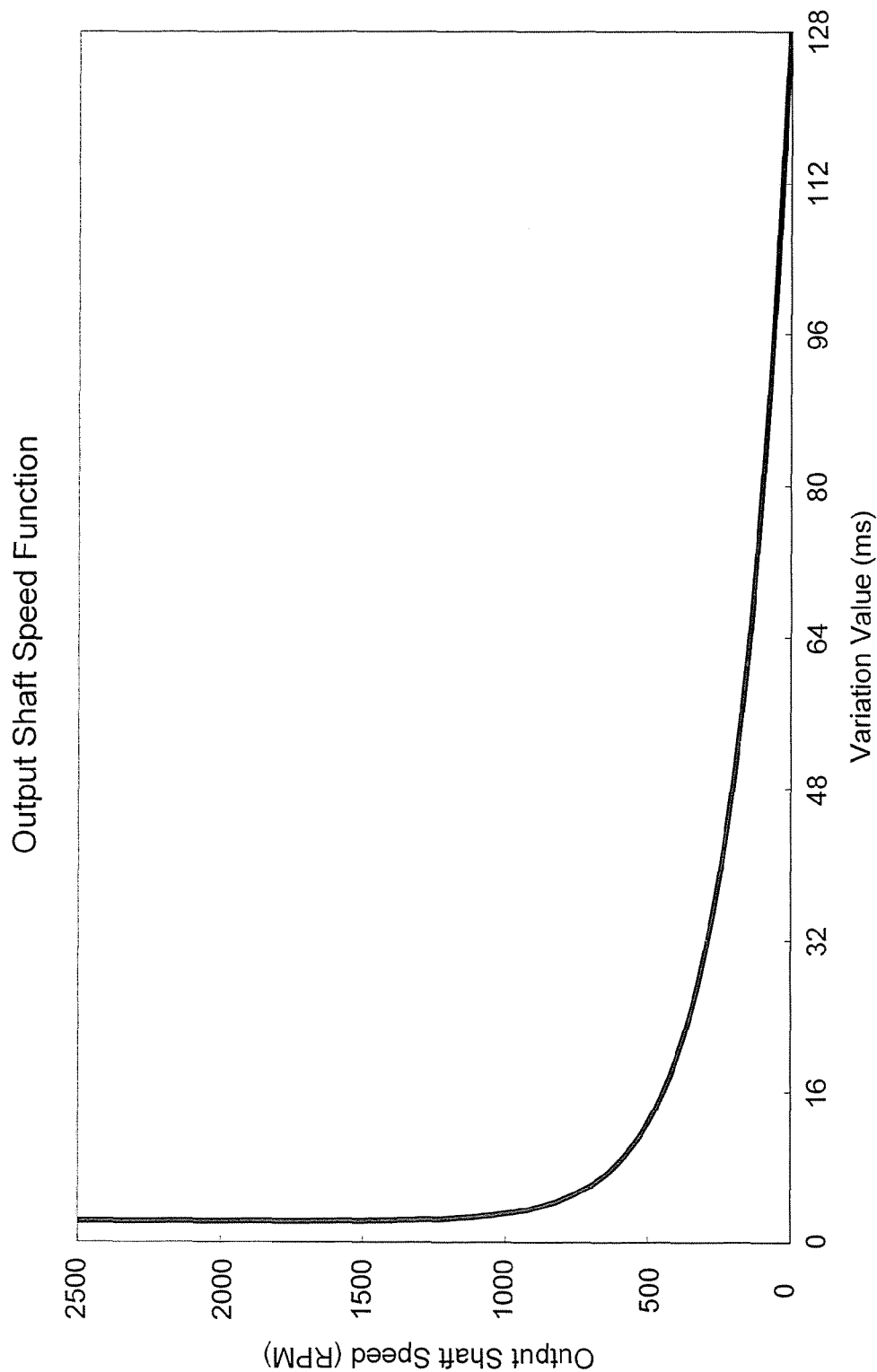
FIG. 7 illustrates output shaft speed as a function of variation value according to the present disclosure.

Referring now to FIG. 7, the vehicle speed determination module 164 may determine the vehicle speed based on an output shaft speed function. The output shaft speed function may return an output shaft speed based on the variation value. Accordingly, the vehicle speed determination module 164 may determine the vehicle speed based on the output shaft speed returned from the output shaft speed function. The output shaft speed function may be based on the exemplary vehicle speed model of FIG. 6. For example, the output shaft speed function may be based on the difference between the right side bounding curve and the left side bounding curve.

The ECM 104 may determine the vehicle speed based on the speed determination system of the present disclosure instead of the counting system. In some implementations, however, the ECM 104 may determine the vehicle speed based on the speed determination system and the counting system. For example, the ECM 104 may determine low vehicle speed (e.g., output shaft speed is less than 1500 RPM) based on the speed determination system since the speed determination system eliminates errors due to high frequency noise at low vehicle speed. The ECM 104 may determine higher vehicle speed (e.g., output shaft speed is greater than 1500 RPM) based on the counting system when high frequency noise may not contribute to errors in vehicle speed measurement.

The ECM 104 may implement both the speed determination system and the counting system in parallel to redundantly determine the vehicle speed. Accordingly, the ECM 104 may perform a rationality check of the counting system based on a comparison of the vehicle speed determined by the counting system with the vehicle speed determined by the speed determination system. The ECM 104 may perform the rationality check to ensure accuracy and reliability of the vehicle speed measurement. For example, the vehicle speed measurement may be in error if the vehicle speed determined using the counting system differs from the vehicle speed determined using the speed determination system by more than a predetermined threshold. Accordingly, the speed determination system may implement the rationality check to determine whether sensors and/or components associated with the sensors are functioning properly.

Figure 8:
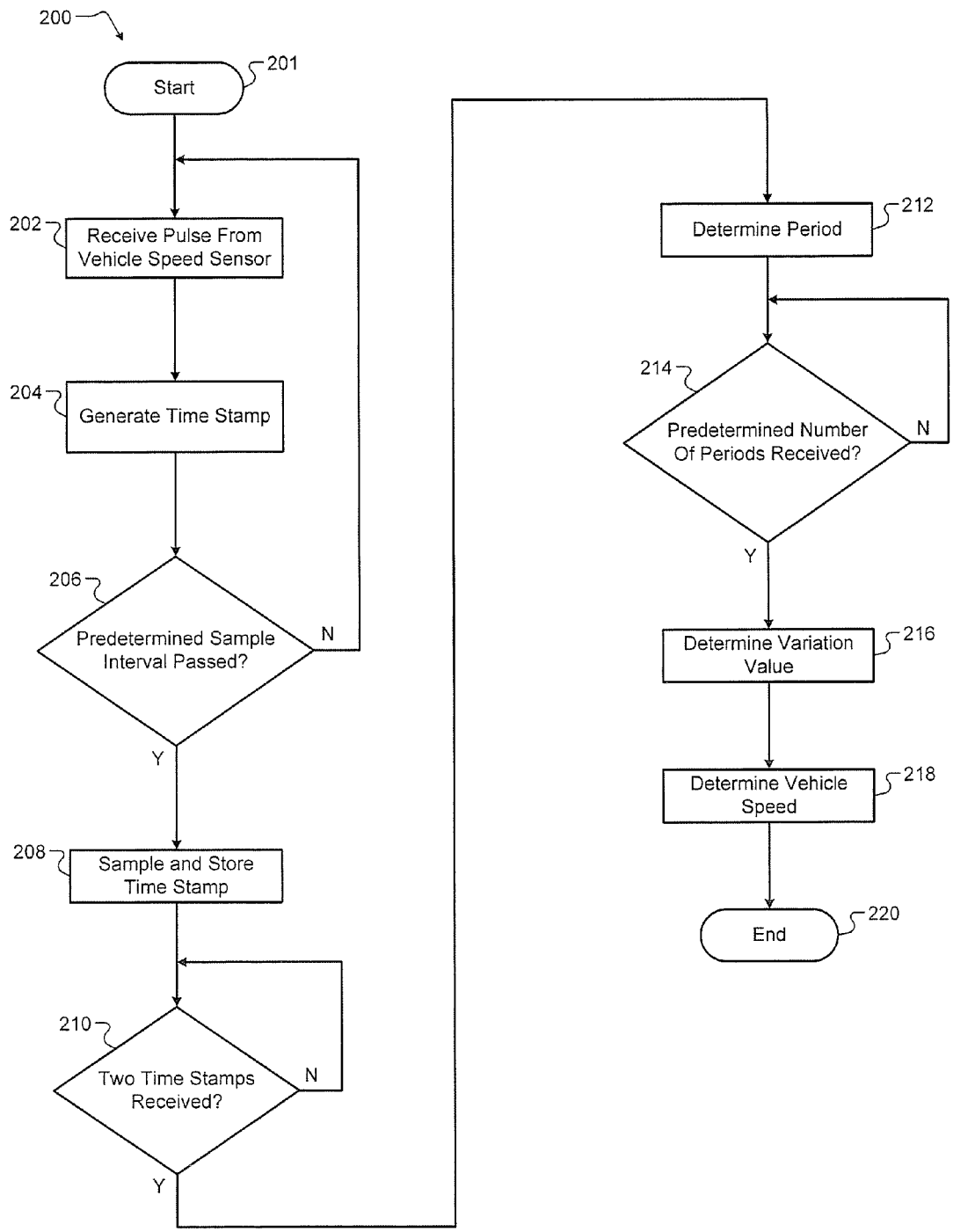
FIG. 8 illustrates a method for determining vehicle speed according to the present disclosure.

Referring now to FIG. 8, a method 200 for determining vehicle speed starts in step 201. In step 202, the TSM 150 receives a pulse from the vehicle speed sensor 130. In step 204, the TSM 150 generates a time stamp corresponding to the received pulse. In step 206, the sampling module 158 determines whether the predetermined sample interval has passed. If the result of step 206 is false, the method 200 repeats step 202. If the result of step 206 is true, the method 200 continues with step 208. In step 208, the sampling module 158 samples and stores the time stamp corresponding to the received pulse.

In step 210, the period determination module 160 determines whether two time stamps have been received. If the result of step 210 is false, the method 200 repeats step 210. If the result of step 210 is true, the method 200 continues with step 212. In step 212, the period determination module 160 determines a period based on a difference between the two time stamps. In step 214, the variation determination module 162 determines whether a predetermined number of periods have been received. If the result of step 214 is false, the method 200 repeats step 214. If the result of step 214 is true, the method 200 continues with step 216. In step 216, the variation determination module 162 determines the variation value. In step 218, the vehicle speed determination module 164 determines the vehicle speed that corresponds to the variation value. The method 200 ends in step 220.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A system comprising:
    a processing module that generates time stamps when pulses are received from a sensor that senses a rotation of a device;
    a sampling module that samples the time stamps during N predetermined intervals and that stores N of the time stamps that correspond to the N predetermined intervals, where N is an integer that is greater than 2;
    a period determination module that determines a plurality of periods, wherein each one of the plurality of periods is based on a difference between two of the N time stamps; and
    a speed determination module that determines a rotational speed of the device based on a difference between magnitudes of two of the plurality of periods.

2. The system of claim 1 wherein the sensor is one of a crankshaft sensor that senses rotation of a crankshaft, a camshaft sensor that senses rotation of a camshaft, a vehicle speed sensor that senses rotation of an output shaft of a transmission, and a wheel speed sensor that senses rotation of a wheel.

3. The system of claim 1 wherein each of the N time stamps corresponds to a last pulse received during each of the N predetermined intervals.

4. The system of claim 1 wherein each one of the plurality of periods is based on a difference between two of the N time stamps from consecutive ones of the N predetermined intervals.

5. The system of claim 1 wherein the speed determination module determines the difference between two of the plurality of periods based on a longest one of the plurality of periods and a shortest one of the plurality of periods.

6. The system of claim 1 wherein the speed determination module determines the rotational speed based on a function that relates the rotational speed to the difference between two of the plurality of periods.

7. The system of claim 1 further comprising a counting module that counts a number of the pulses received from the sensor and that determines a second rotational speed of the device based on the number of the pulses received from the sensor.

8. The system of claim 7 wherein the speed determination module indicates when a difference between the rotational speed of the device and the second rotational speed of the device is greater than a predetermined threshold.

9. A method comprising:
in one or more processing modules of a vehicle:
generating time stamps when pulses are received from a sensor that senses a rotation of a device;
sampling the time stamps during N predetermined intervals;
storing N of the time stamps that correspond to the N predetermined intervals, where N is an integer that is greater than 2;
determining a plurality of periods, wherein each one of the plurality of periods is based on a difference between two of the N time stamps;
determining a rotational speed of the device based on a difference between magnitudes of two of the plurality of periods; and
altering an operating parameter of at least one of the vehicle and an engine of the vehicle based on the rotational speed.

10. The method of claim 9 further comprising, in the one or more processing modules of the vehicle, generating time stamps when pulses are received from one of a crankshaft sensor that senses rotation of a crankshaft, a camshaft sensor that senses rotation of a camshaft, a vehicle speed sensor that senses rotation of an output shaft of a transmission, and a wheel speed sensor that senses rotation of a wheel.

11. The method of claim 9 further comprising, in the one or more processing modules of the vehicle, storing the N time stamps corresponding to last pulses received during the N predetermined intervals.

12. The method of claim 9 further comprising, in the one or more processing modules of the vehicle, determining each one of the plurality of periods based on a difference between two of the N time stamps from consecutive ones of the N predetermined intervals.

13. The method of claim 9 further comprising, in the one or more processing modules of the vehicle, determining the difference between two of the plurality of periods based on a longest one of the plurality of periods and a shortest one of the plurality of periods.

14. The method of claim 9 further comprising, in the one or more processing modules of the vehicle, determining the rotational speed based on a function that relates the rotational speed to the difference between two of the plurality of periods.

15. The method of claim 9 further comprising, in the one or more processing modules of the vehicle:
counting a number of the pulses received from the sensor; and
determining a second rotational speed of the device based on the number of the pulses received from the sensor.

16. The method of claim 15 further comprising, in the one or more processing modules of the vehicle, indicating when a difference between the rotational speed of the device and the second rotational speed of the device is greater than a predetermined threshold.

17. A system comprising:
a processing module that generates time stamps when pulses are received from a sensor that senses a rotation of a device;
a period determination module that determines a plurality of periods, wherein each one of the plurality of periods is based on a difference between two of the time stamps; and
a speed determination module that determines a rotational speed of the device based on a difference between magnitudes of two of the plurality of periods.

18. The system of claim 17 wherein the period determination module determines each one of the plurality of periods based on two of the time stamps that are generated during separate predetermined intervals.

19. The system of claim 17 wherein the speed determination module determines the difference between two of the plurality of periods based on a longest one of the plurality of periods and a shortest one of the plurality of periods.

20. The system of claim 18 wherein each of the time stamps corresponds to a last pulse received during each of the predetermined intervals, and wherein each one of the plurality of periods is based on a difference between two of the time stamps from consecutive ones of the predetermined intervals.

* * * * *